United States Patent [19]

Hayashi et al.

[11] Patent Number: 4,831,878
[45] Date of Patent: May 23, 1989

[54] STRUCTURE FOR MOUNTING LIQUID LEVEL METER

[75] Inventors: Chikahisa Hayashi; Makoto Kawai; Yoshikazu Hirose; Tatsuya Terayama, all of Aichi; Nobutsugu Miyazaki; Hideo Yamamoto, both of Toyota, all of Japan

[73] Assignees: Toyoda Gosei Co., Ltd., Nishikasugai; Horie Metal Co., Ltd., Toyota, both of Japan

[21] Appl. No.: 44,833

[22] Filed: May 1, 1987

[30] Foreign Application Priority Data

| May 1, 1986 [JP] | Japan | 61-101471 |
| May 1, 1986 [JP] | Japan | 61-101472 |
| Jul. 21, 1986 [JP] | Japan | 61-171299 |

[51] Int. Cl.$^4$ .............................. G01F 23/68
[52] U.S. Cl. ........................ 73/313; 73/319; 73/290 R
[58] Field of Search ............... 116/228; 73/313, 319, 73/DIG. 5, 314, 308, 290 R; 200/84 C

[56] References Cited

U.S. PATENT DOCUMENTS

| 2,569,106 | 9/1951 | James et al. | 73/313 |
| 2,771,774 | 11/1956 | Fornasieri | 73/313 |
| 3,366,276 | 1/1968 | Fridley | 200/84 C |
| 3,417,613 | 12/1968 | Barnstorf | 73/319 |
| 3,982,087 | 9/1976 | Bachman | 200/84 C |
| 4,164,145 | 8/1979 | Aron | 73/293 |
| 4,627,280 | 12/1986 | Hayashi et al. | 73/290 R |
| 4,627,283 | 12/1986 | Nishida et al. | 73/313 |

FOREIGN PATENT DOCUMENTS

| 2730029 | 1/1979 | Fed. Rep. of Germany | 73/313 |
| 486224 | 1/1976 | U.S.S.R. | 73/313 |

Primary Examiner—William A. Cuchlinski, Jr.
Assistant Examiner—W. Morris Worth
Attorney, Agent, or Firm—Cushman, Darby & Cushman

[57] ABSTRACT

A level gage mounting structure comprising a level gage secured to an upper member of a liquid storage container and vertically extending inside the container, the level gage having its lower end supported on the bottom surface of the container, and a deformable member provided between the upper member and the upper end of the level gage to support the upper end of the level gage, the deformable member being deformable vertically in unison with any vertical deformation of the upper and bottom surfaces of the container, thus enabling the lower end of the level gage to be in contact with the bottom surface of the container at all times.

21 Claims, 10 Drawing Sheets

STRUCTURE FOR MOUNTING LIQUID LEVEL METER

BACKGROUND OF THE INVENTION

1. Field of the Invention

The present invention relates to a structure for mounting a level gage with respect to a liquid storage container which is provided on a vehicle, an industrial machine, an instrument or the like.

2. Description of the Related Art

There are known various types of level gage for detecting the levels of petroleum, water and various kinds of medicine which are stored in containers such as tanks. Among them is one type of level gage which is described in, for example, the specification of U.S. Pat. No. 4,627,280.

This level gage 50 comprises, as shown in FIG. 14, a casing 54, a core 56 inserted inside the casing 54, a coil 57 wound around the core 56, and an electrically conductive ring 58 vertically movably fitted on the outer periphery of the casing 54.

The casing 54 is secured at its upper portion to an upper member 52 of a storage container 51. The electrically conductive ring 58 is secured to a float 59 so that the ring 58 floats on a liquid 53 and moves vertically along the periphery of the casing 54. In this level gage 50, the electrically conductive ring 58 moves vertically in accordance with the change in the liquid level 64 as a result of increase or decrease of the liquid 53 in the storage container 51. The inductance of the coil 57 changes in response to the vertical movement of the ring 58, and the change in conductance enables the liquid level to be accurately detected through a meter or other similar means.

However, when the internal pressure of the storage container 51 is raised above normal pressures by, for example, a rise in temperature, the lower member 55 of the container 51 may be inflated downward as shown by the two-dot chain line in the figure. In such a case, even if the amount of liquid 53 stored in the container 51 is constant, the liquid level 64 lowers as shown by the two-dot chain line. Further, the upper member 52 of the container 51 is also inflated as shown by the two-dot chain line, so that the installation position of the level gage 50 which is rigidly secured to the upper member 52 becomes higher than that in the case of normal pressures. Accordingly, there may be an error in the level 64 detected by the level gage 50, disadvantageously.

Problems arise due to the container's deflation when the internal pressures of the storage container 51 lowers below normal pressures.

In view of the above-described circumstances, the present inventors made exhaustive study to obtain a structure for mounting the level gage 50 which enables minimization of the above-described error, and found the fact that said object is attained by providing the level gage 50 inside the storage container 51 in such a manner that the lower end of the level gage 50 is supported on the bottom surface of the storage container 51 so that the level gage 50 is allowed to vertically move in response to the vertical movement of the bottom surface of the lower member 55 relative to the upper member 52. However, there are still problems as follows.

The first problem is to design a structure for constantly biasing the level gage 50 toward the bottom surface of the storage container 51, and the second problem is to find an effective way in which the level gage 50, particularly the upper end thereof, is supported inside the storage container 51.

The coil 57 consists of two portions, that is, a densely wound coil portion 61 which is formed by densely winding a conductor around the outer periphery of the upper part of the core 56 and a coarsely wound coil portion 62 which is formed by coarsely winding a conductor below the densely wound coil portion 61.

However, the diameter of the portion (the head portion 63) of the casing 54 which has the densely wound coil portion 61 is larger than that of the portion (the guide portion) of the casing 54 which incorporates the coarsely wound coil portion 62. Accordingly, when a liquid is supplied into the storage container 51 and the electrically conductive ring 58 is thereby raised, the ring 58 comes into contact with the head portion 63 as shown by the two-dot chain line in FIG. 14, which makes it impossible to detect the liquid level 64.

Accordingly, it is impossible with the above-described technique to detect the liquid level 64 when the storage container 51 is filled up with the liquid 53. Therefore, it is general practice to use the container 51 in such a manner that it is not filled up with the liquid 53, which disadvantageously lowers the service efficiency of the storage container 51.

SUMMARY OF THE INVENTION

It is an object of the present invention to provide a structure for mounting a level gage which facilitates mounting of the level gage and a bent tube with respect to a liquid storage container and which has a reduced number of sealing portions and enables the container to be sealed satisfactorily.

It is another object of the present invention to provide a structure for mounting a level gage which involves no need to provide a guide member for the upper portion of the level gage as a separate member.

It is still another object of the present invention to provide a structure for mounting a level gage which enables the level gage to detect the liquid level with substantially no error.

It is a further object of the present invention to provide a structure for mounting a level gage which involves no fear of a lead wire being entangled with another member.

It is a still further object of the present invention to provide a structure for mounting a level gage which enables the level gage to quickly and reliably respond to a lowering of the liquid level in detection of the liquid level.

It is a still further object of the present invention to provide a structure for mounting a level gage which enables a stretchable member to be readily mounted with respect to a liquid storage container and to the level gage.

It is a still further object of the present invention to provide a structure for mounting a level gage which involves no fear of the upper portion of the level gage oscillating horizontally.

It is a still further object of the present invention to provide a structure for mounting a level gage which enables enlargement of the measurable range of the level gage.

It is a still further object of the present invention to provide a structure for mounting a level gage which eliminates the need to provide a space in a liquid storage container for accommodating the enlarged-diameter portion of the level gage and enables a correspondingly large amount of liquid to be stored therein.

It is a still further object of the present invention to provide a structure for mounting a level gage which eliminates the need to machine a lower member for supporting the lower end portion of the level gage.

To these ends, the present invention provides a level gage mounting structure comprising: a level gage secured to an upper member of a liquid storage container and vertically extending inside the container, the level gage having its lower end supported on the bottom surface of the container; and a deformable member provided between the upper member and the upper end of the level gage to support the upper end of the level gage, the deformable member being deformable vertically in unison with any vertical deformation of the upper and bottom surfaces of the container, thus enabling the lower end of the level gage to be in contact with the bottom surface of the container at all times.

The above and other objects of the present invention will become clear from the understanding of preferred embodiments thereof described below and clearly stated in the appended claims. Many other features and advantages which are not mentioned in this specification will become apparent to those skilled in the art when carrying out the present invention.

DETAILED DESCRIPTION OF THE PREFERRED EMBODIMENTS

Figure 1:
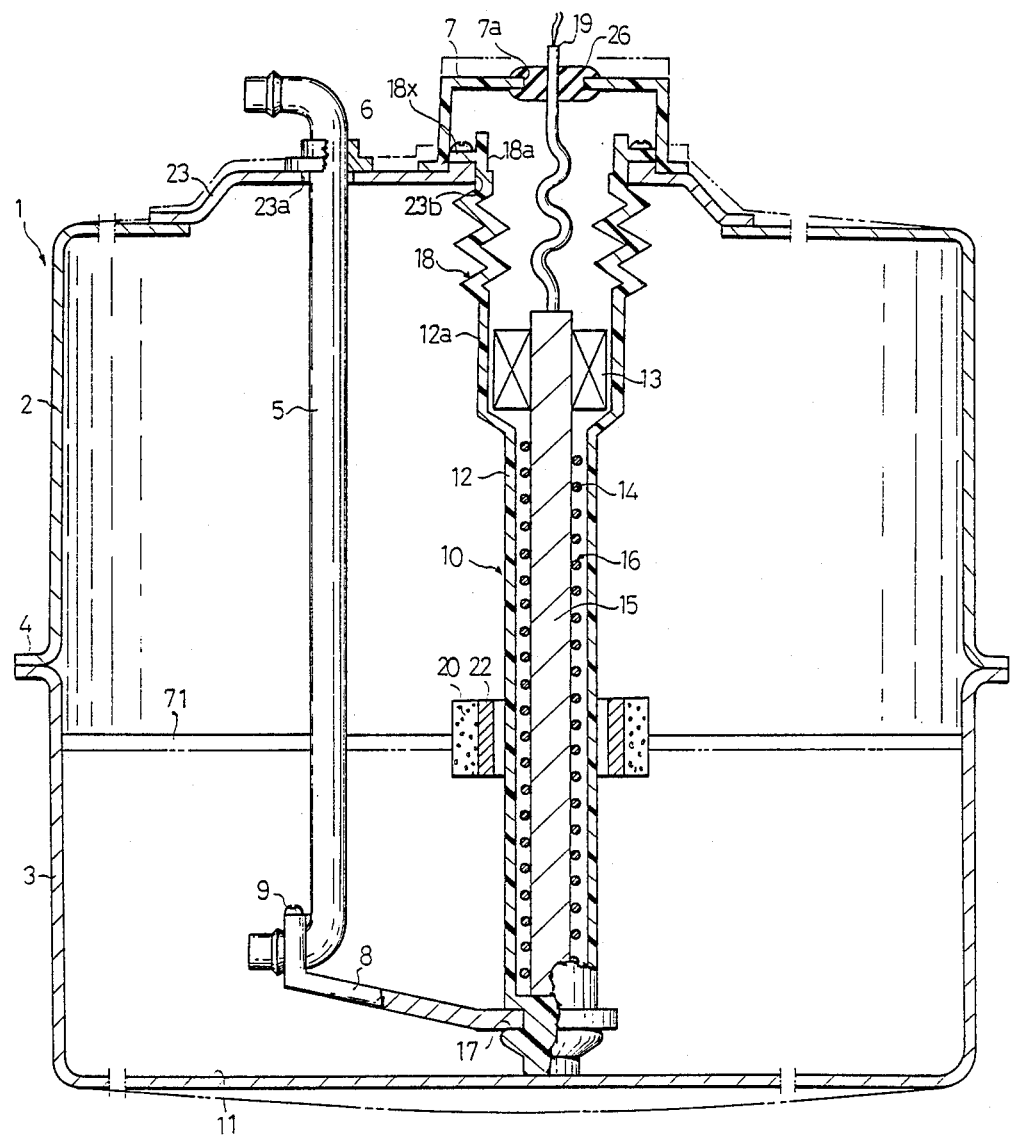
FIG. 1 is a vertical sectional view of a first embodiment of the present invention.

A first embodiment of the present invention in which the invention is embodied in a fuel tank for a vehicle will be described hereinunder with reference to FIG. 1.

A fuel tank 1 which is a container for storing a fuel 71 such as gasoline, light oil or the like is a substantially flat hermetically sealed container formed by welding together a metallic upper member 2 which defines the upper part of the tank 1 and a lower member 3 which defines the lower part thereof. A flange 4 which is defined by the joint between the upper and lower members 2 and 3 projects from the center of the side of the fuel tank 1 and extends over the entire periphery thereof.

The upper member 2 is provided with a detachable concave or flat mounting means 23 which defines part of the upper member 2. The mounting means 23 is provided with a circular mounting opening 23b having a circular cross-section and a circular insertion bore 23a which is smaller than the opening 23b. The former is arranged so that a stretchable member 18 (described later) can be mounted therethrough, and the latter is adapted to receive a bent tube 5 for discharging the fuel 71.

The mounting means 23 is provided with a lidded cylindrical protector 7 for covering the mounting opening 23b from the upper side thereof, the protector 7 having a lead wire outlet 7a provided in the center of its upper portion.

The upper portion of the bent tube 5 is rigidly secured by means of a clamp member 6 provided on the mounting means 23, the lower end portion of the tube 5 extending as far as the bottom portion of the fuel tank 1. It should be noted that the clamp member 6 is secured to the mounting means 23 by means, for example, of welding, thus sealing the area between the bent tube 5 and the insertion bore 23a.

The proximal end portion of a relatively long and narrow support member 8 which extends substantially horizontally is rigidly secured to the lower portion of the bent tube 5 which is within the fuel tank 1 by a securing means 9 such as a screw or thermowelding.

The distal end portion of the support member 8 clamps the lower portion of a level gage 10 for detecting the level of the fuel 71. The support member 8 is formed from a resilient material such as a synthetic resin so as to bias the level gage 10 downward. The lower end of the level gage 10 is supported on the bottom surface 11 of the lower member 3.

The level gage 10 includes a cylindrical synthetic resin casing 12 having an enlarged diameter portion 12a in its upper part. An annular groove 17 for retaining the distal end portion of the support member 8 is formed in the lower end portion of the casing 12.

The stretchable member 18 which is formed integral with the casing 12 from a synthetic resin material extends upward from the upper end of the casing 12, the upper end portion 18a of the member 18 being inserted into the mounting opening 23b provided in the mounting means 23. A flange portion 18x which is formed on the outer periphery of the upper end portion 18a is rigidly secured to the mounting means 23. The stretchable member 18 is maintained in a compressed state at all times.

It should be noted that the stretchable member 18 is formed integral with the casing 12 by the injection blow molding process.

A rod-shaped core 15 made of ferrite, rolled silicone steel plate or the like is inserted into the casing 12, and a coil 16 is wound on the core 15. The coil 16 consists of a densely wound coil portion 13 formed within the enlarged diameter portion 12a and a coarsely wound coil portion 14 formed below the enlarged diameter portion 12a. The coil portions 13 and 14 are continuously supplied with electric current.

A single lead wire 19 extends upward from the densely and coarsely wound coil portions 13 and 14 so as to be led out to the outside from the lead wire outlet 7a provided in the protector 7. It should be noted that the lead wire outlet 7a is hermetically sealed by a sealing member 26 after the lead wire 19 has been led out therefrom.

An electrically conductive ring 22 which is formed from a material having a relatively small specific gravity such as aluminum or an electrically conductive resin or the like is vertically movably fitted on the outer periphery of the casing 12 and is electromagnetically coupled with the densely and coarsely wound coil portions 13 and 14 of the coil 16. Further, a doughnut-shaped float 20 which is formed from a foamed resin or the like is secured to the electrically conductive ring 22, thus enabling the ring 22 to float on the fuel 71.

The functions and effects of this embodiment arranged as detailed above will next be explained.

First, the bent tube 5 and the level gage 10 are set on the mounting means 23 of the upper member 2 in advance. The protector 7 is then rigidly secured to the mounting means 23. Thereafter, the mounting means 23 is rigidly secured to the upper member 2.

In consequence, the bent tube 5 and the level gage 10 are mounted on the fuel tank 1 and, at the same time, the fuel tank 1 is sealed. Accordingly, in this embodiment the level gage 10 and the bent tube 5 can readily be mounted with respect to the fuel tank 1, and the number of required sealing portions is favorably small, so that the fuel tank 1 has excellent sealing properties.

When the pressure inside the fuel tank 1 is increased by a rise in temperature and the upper and lower members 2 and 3 of the tank 1 are consequently inflated vertically as shown by the two-dot chain line in the figure, the level of the fuel 71 also lowers as shown by the two-dot chain line even if the volume of the fuel 71 is constant.

In such a case, since the stretchable member 18 is secured to the mounting means 23 at the upper side of the level gage 10 in a compressed state at all times, the level gage 10 is constantly biased downward by the resilient action of the stretchable member 18. Accordingly, when the lower member 3 is inflated downward, the level gage 10 also moves downward in unison with the lower member 3. Since the stretchable member 18 allows the level gage 10 to move downward while maintaining the upper portion of the level gage 10 so as to extend in the axial direction thereof, the member 18 functions as a kind of guide. Accordingly, it is unnecessary to provide a guide member for the upper portion of the level gage 10 as a separate member within the fuel tank 1 in accordance with this embodiment.

Since the lower end of the level gage 10 is rigidly secured to the distal end portion of the support member 8 so that said lower end will not move horizontally on the bottom surface 11, the vertical movement of the level gage 10 is effected even more smoothly in cooperation with the action of the stretchable member 18.

Accordingly, when the lower member 3 of the fuel tank 1 is inflated downward, the level age 10 is allowed to smoothly move downward in accordance with the inflation of the lower member 3, and there is therefore substantially no error in the level of the fuel 71 detected by the level gage 10.

Since the upper portion of the level gage 10 is supported by the stretchable member 18, the lead wire 19 can be accommodated and protected within the member 18, so that there is no fear of the lead wire 19 being entangled with another member.

The above-described functions and effects are similarly exhibited also in the case where the fuel tank 1 is contracted contrary to the above. Further, advantageous effects which are similar to the above are offered even when either the mounting member 23 of the upper member 2 or the bottom surface 11 of the lower member 3 alone is moved vertically by expansion or contraction of the fuel tank 1 in a state wherein either one of the upper and lower members 2 and 3 is fixed.

Figure 2:
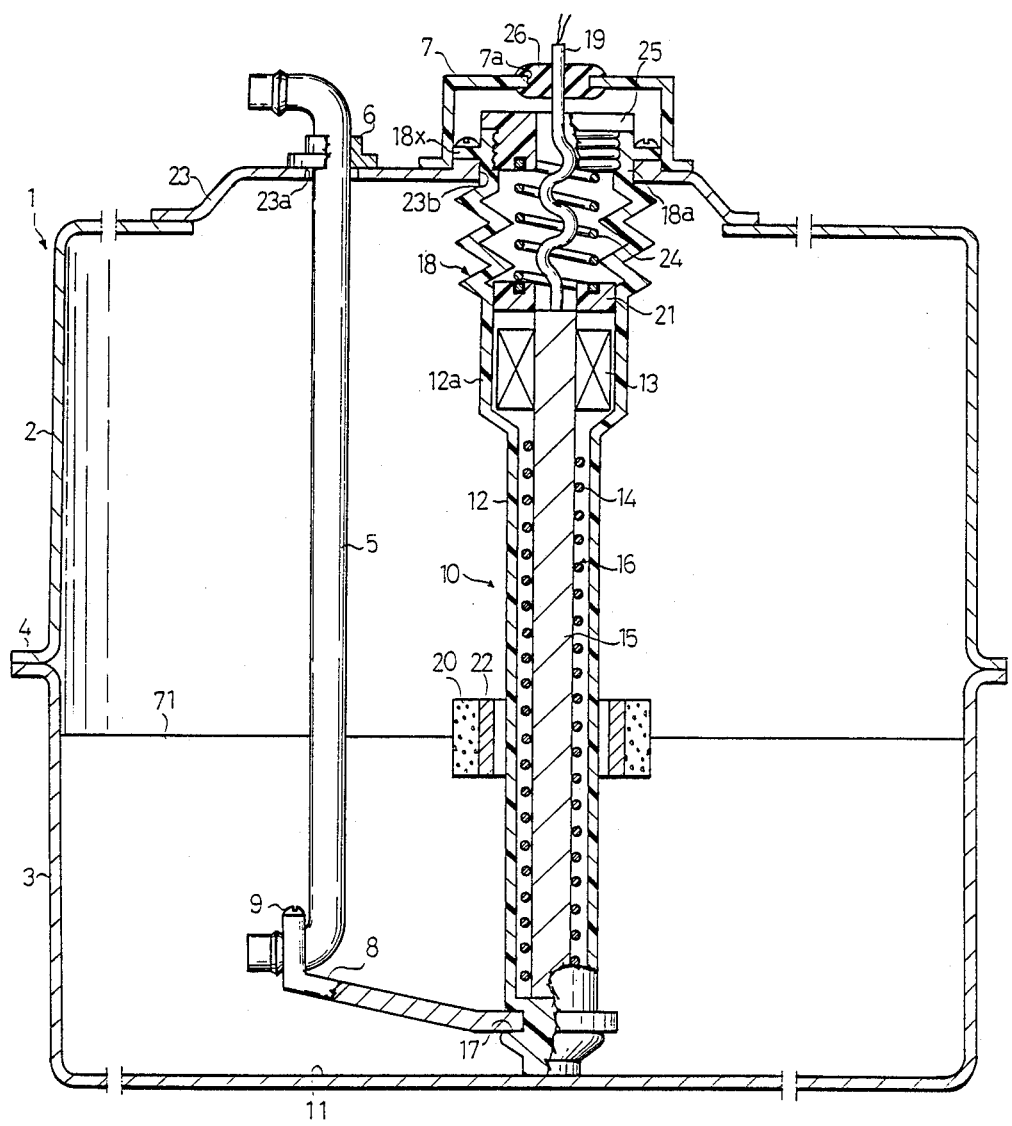
FIG. 2 is a vertical sectional view of a second embodiment of the present invention.

A second embodiment in which the mounting structure according to the present invention is embodied in another form will next be explained with reference to FIG. 2.

In this embodiment, the stretchable member 18 is provided at the upper side of the level gage 10 in the same way as in the first embodiment, and a coil spring is provided inside the stretchable member 18 so as to bias the level gage 10 downward even more positively.

A spring retainer 21 is provided within the casing 12 and above the enlarged diameter portion 12a, and a tap-shaped spring retainer 25 is screwed into the upper end of the stretchable member 18 above the spring retainer 21. A coil spring 24 is stretched between the spring retainers 21 and 25 in a compressed state so as to bias the level gage 10 downward.

The lead wire 19 which extends upward from the upper end of the densely wound coil portion 13 of the coil 16 is passed through the inside of the coil spring 24. The lead wire 19 is led out to the outside from the lead wire outlet 7a provided in the protector 7.

The arrangement of the other portions is the same as that of the first embodiment.

In this embodiment, the following advantageous effect is offered in addition to the effects which are similar to those exhibited in the first embodiment. Namely, since the level gage 10 is positively biased downward by the action of the coil spring 24 provided in the stretchable member 18, when the lower member 3 is inflated downward and the bottom surface 11 consequently moves downward, the level gage 10 is allowed to immediately move in unison with the bottom surface 11. Accordingly, it is advantageously possible for the level gage 10 to respond to a lowering of the liquid level even more reliably and quickly.

Figure 3:
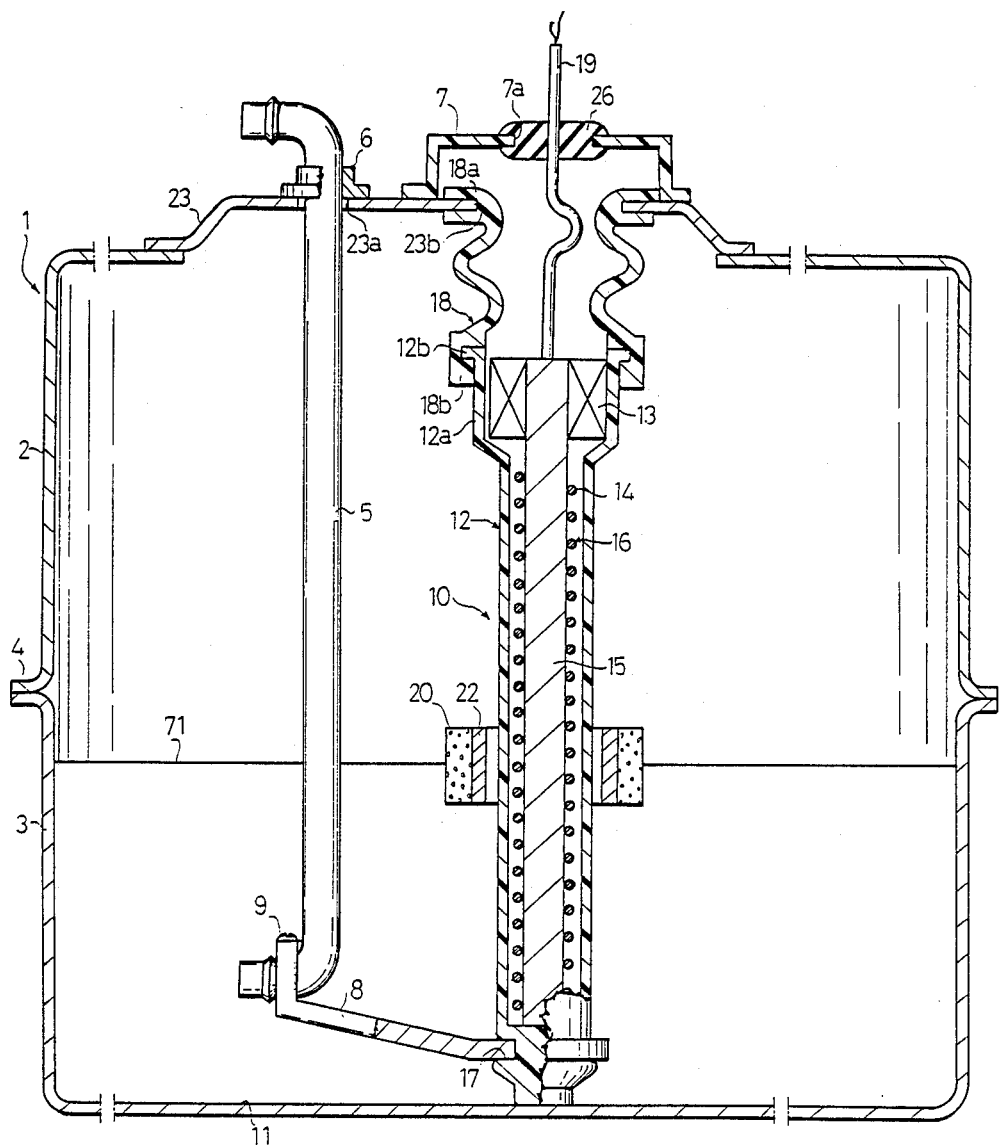
FIG. 3 is a vertical sectional view of a third embodiment of the present invention.

A third embodiment in which the mounting structure according to the present invention is embodied in still another form will be explained below with reference to FIG. 3.

In this embodiment, the stretchable member 18 is formed from a synthetic rubber material as a separate member from the casing 12 and secured to the upper portion of the enlarged diameter portion 12a.

Describing the arrangement of an essential part of this embodiment, a flange portion 12b is formed at the upper end of the enlarged diameter portion 12a of the casing 12. The stretchable member 18 which is formed from a resiliently stretchable synthetic rubber material is connected to the flange portion 12b, the lower end portion 18b of the member 18 clamping the flange 12b.

The upper end portion 18a of the stretchable member 18 extends upward and is bonded to the inner peripheral edge portion of the mounting opening 23b of the mounting means 23 by means of vulcanization. In this embodiment also, the stretchable member 18 is mounted in a state wherein it is constantly compressed between the enlarged diameter portion 12a and the mounting means 23.

The arrangement of the other portions is the same as that of the first embodiment.

In this embodiment, the following advantageous effect is offered in addition to the effects which are similar to those exhibited in the first embodiment. Namely, since the stretchable member 18 is made from a synthetic rubber material, it can readily be mounted with respect to the enlarged diameter portion 12a and the mounting opening 23b of the mounting means 23 by making use of its elasticity.

Figure 4:
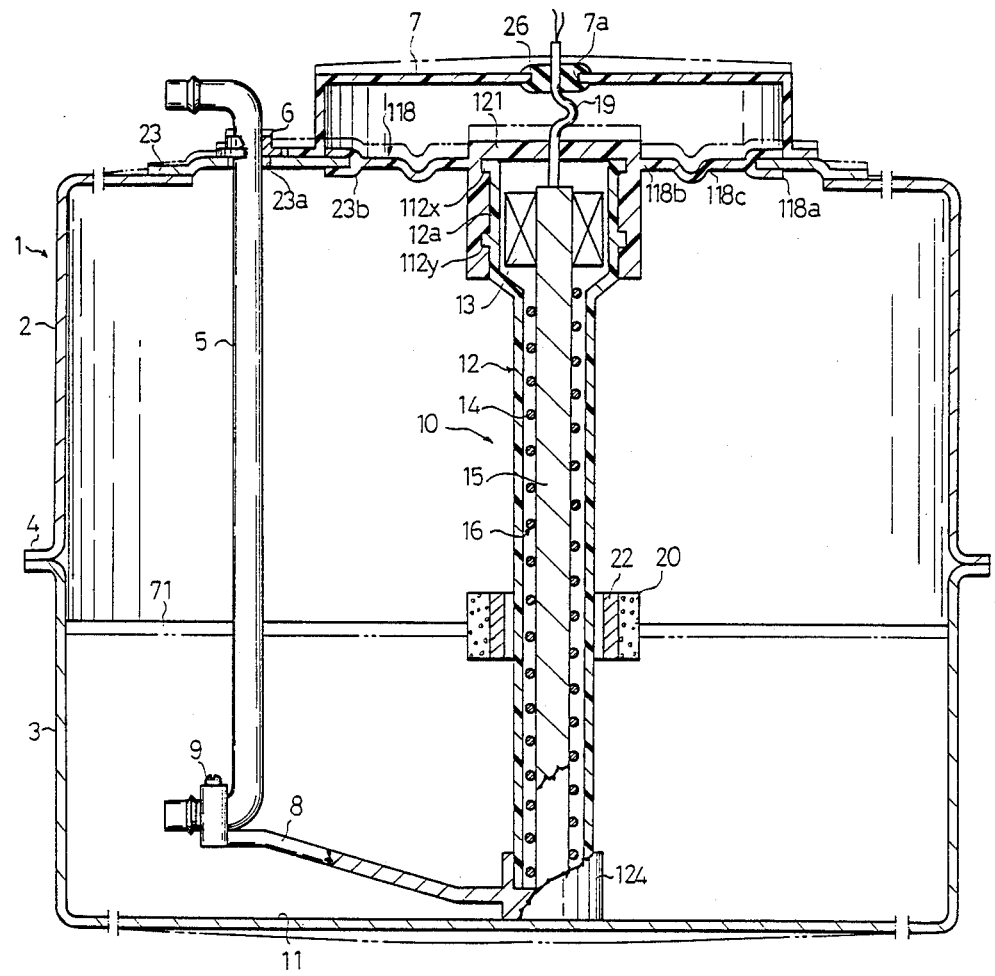
FIG. 4 is a vertical sectional view of a fourth embodiment of the present invention.

A fourth embodiment of the present invention will next be described with reference to FIG. 4.

The distal end portion of the support member 8 is formed integral with a bottom cap 124 for the level gage 10. The support member 8 is formed from a resilient material such as a synthetic resin in order to enable the level gage 10 to reliably respond to any vertical movement of the bottom surface 11, thus constantly biasing the bottom cap 124 toward the bottom surface 11 of the lower member 3.

A pair of upper and lower flange portions 112x and 112y are formed on the outer periphery of the enlarged diameter portion 12a of the casing 12.

Further, a lidded cylindrical synthetic rubber cap member 121 is fitted on the enlarged diameter portion 12a from the upper side thereof, the inner surface of the cap member 121 being engaged with the flange portions 112x and 112y so as to prevent separation of the casing 12 from the cap member 121.

A bored disk-shaped diaphragm 118 which extends substantially horizontally is formed integral with the outer periphery of the upper portion of the cap member 121. A curved portion 118c having a curved radial cross-sectional configuration is formed at an intermediate portion of the diaphragm 118 between the outer peripheral edge portion 118a and the inner peripheral edge portion 118b.

The curved portion 118c is provided in order to compensate for a shortage of the diametrical length of the diaphragm 118 which may be generated when the inner peripheral edge portion 118b moves vertically.

The lead wire 19 is passed through the cap member 121 and led out to the outside from the lead wire outlet 7a provided in the protector 7.

The following is a description of functions and effects of this embodiment arranged as described above.

When the pressure inside the fuel tank 1 is increased by a rise in temperature and the level of the fuel 71 consequently lowers, the level gage 10 acts as follows.

Namely, since the lower end of the level gage 10 is supported on the bottom surface 11 of the lower member 3 and constantly biased downward by the action of the support member 8, the level gage 10 is allowed to move downward in unison with the inflation of the lower member 3.

The diaphragm 118 functions as a guide member for supporting the upper portion of the level gage 10 so as not to oscillate horizontally. Further, since the diaphragm 118 is resiliently movable in the vertically direction, the level gage 10 is allowed to move downward even more smoothly.

Accordingly, there is substantially no error in the level of the fuel 71 detected by the level gage 10 in the same way as in each of the above-described embodiments.

Further, since the upper portion of the level gage 10 is supported by the diaphragm 118, said upper portion is prevented from oscillating horizontally. Accordingly, there is no fear of the lead wire 19 being entangled with another member.

Figure 5:
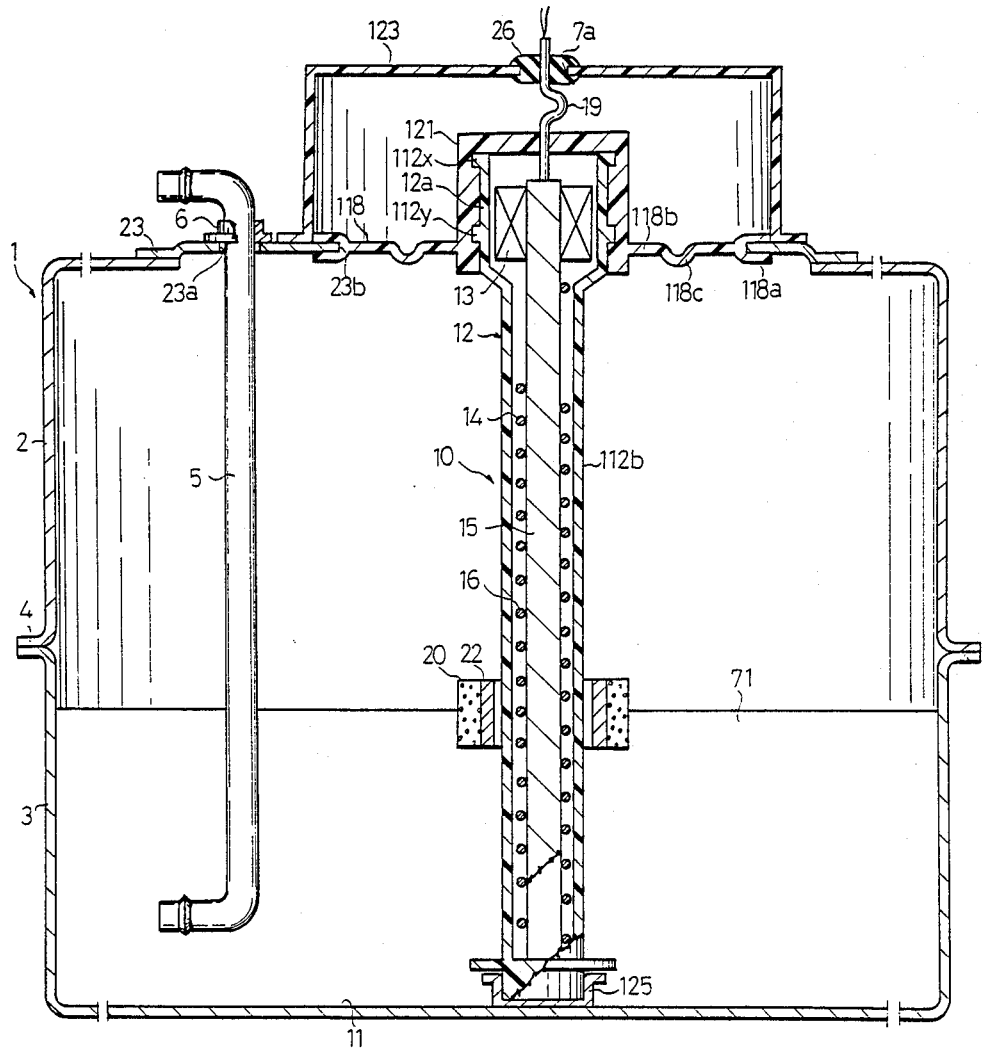
FIGS. 5 and 6 are vertical sectional views of a fifth embodiment of the present invention.
Figure 6:
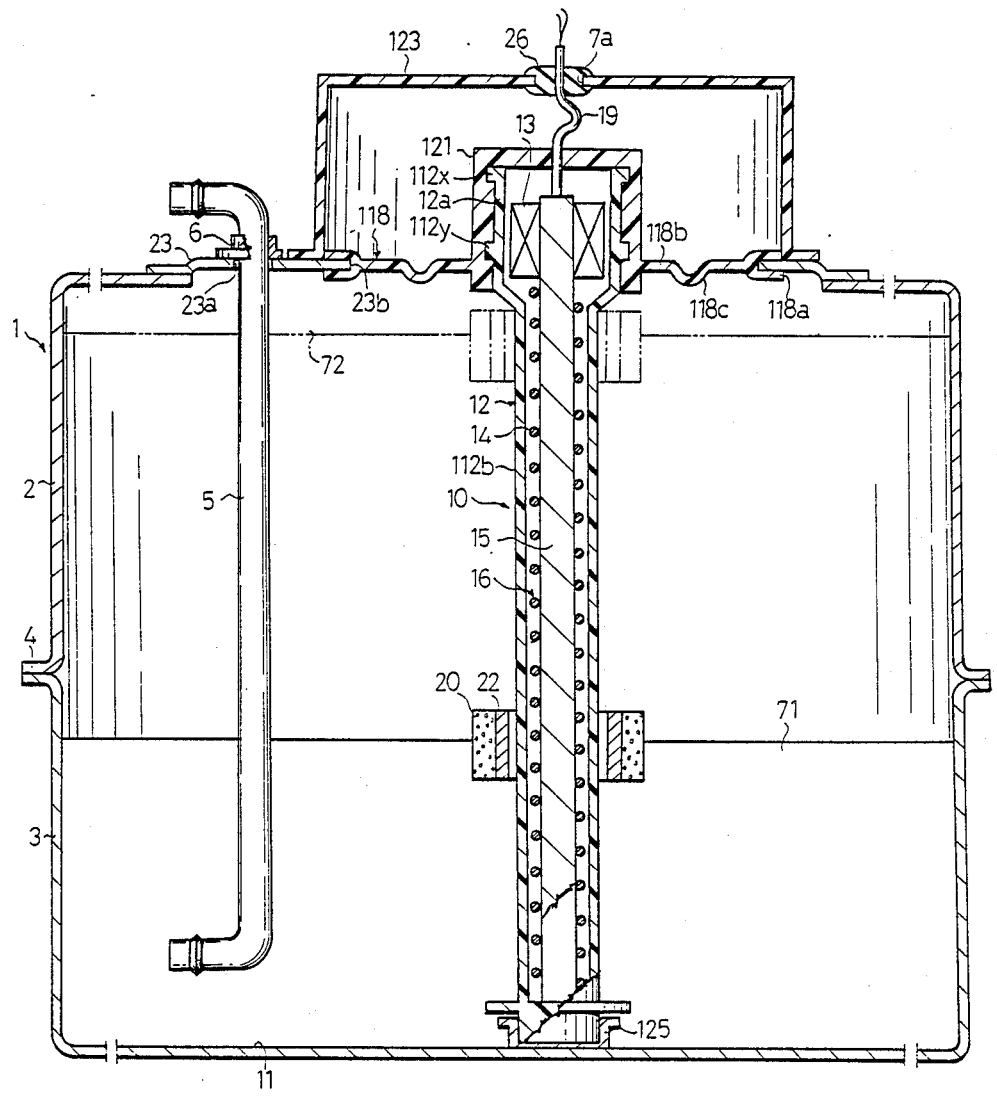

A fifth embodiment in which the present invention is embodied in a still further form will be described below with reference to FIGS. 5 and 6.

In this embodiment, the diaphragm 118 is provided at the upper end of the level gage 10 in the same way as in the fourth embodiment, but the position at which the diaphragm 118 is secured is changed to the lower portion of the cap member 121.

The diaphragm 118 is secured to the lower portion of the cap member 121, and the greater part of the enlarged diameter portion 12a projects upward from the diaphragm 118. Further, an accommodating means 123 projects upward by an amount corresponding to the amount by which the diaphragm 118 projects upward.

It should be noted that the lower end portion of the level gage 10 is received in a concave member 125 which is rigidly secured to the bottom surface 11 of the lower member 3. This embodiment differs from the fourth embodiment in that the lower end portion of the level gage 10 is supported on the bottom surface 11 without being positioned by means of the support member 8. A guide portion 112b extends downward from the enlarged diameter portion 12a of the casing 12, the guide portion 112b having a slightly shorter length than the distance between the bottom surface 11 and the mounting means 23.

The arrangement of the other portions is the same as that of the fourth embodiment.

In this embodiment also, functions and effects which are similar to those in the fourth embodiment are exhibited. In addition to them, it is advantageously possible to increase the range within which the electrically conductive ring 22 can move vertically in the level gage 10 and hence enlarge the measurable range of the level gage 10.

Figure 14:
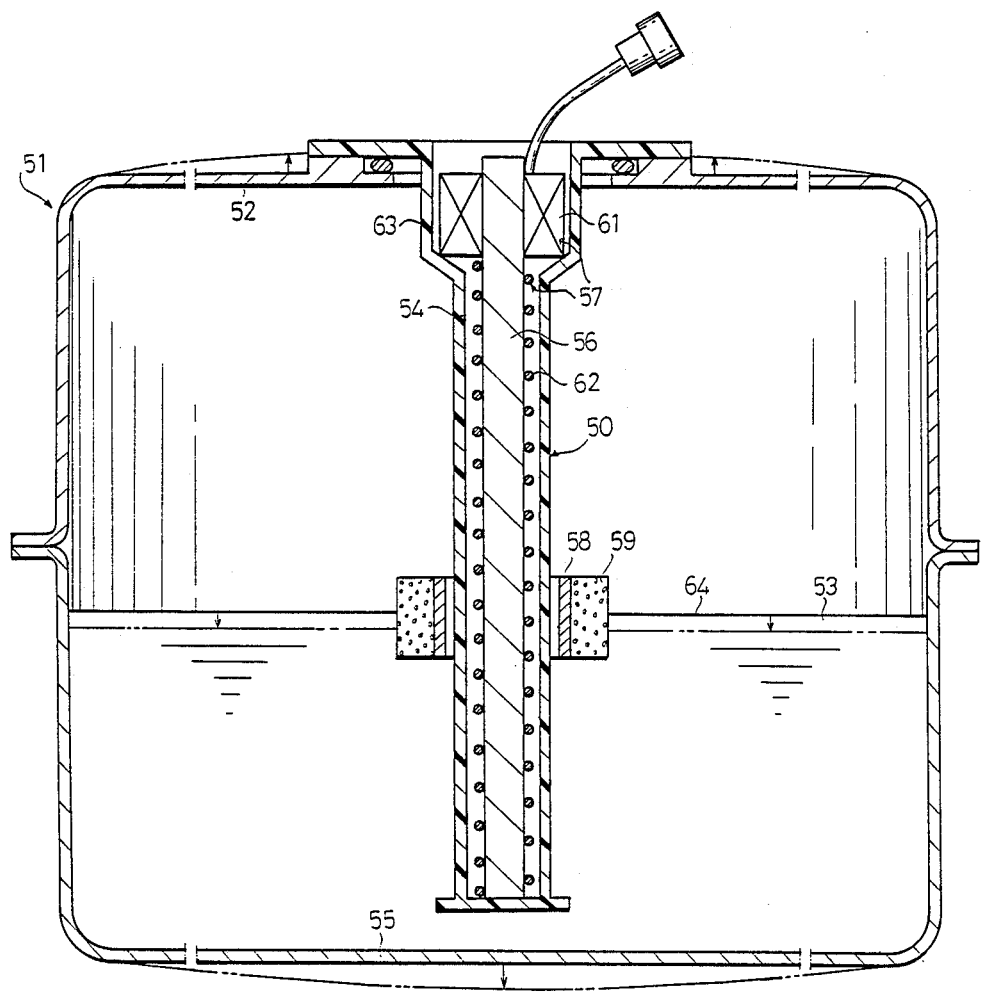
FIG. 14 is a vertical sectional view of a related art.

More specifically, since the diaphragm 118 is rigidly secured to the lower portion of the cap member 121 in such a manner as to be integral therewith, the enlarged diameter portion 12a of the level gage 10 projects upward from the mounting means 23. Accordingly, the enlarged diameter portion 12a is installed above a full level 72 (shown by the two-dot chain line in FIG. 6) which is reached when the fuel tank 1 is filled with the fuel 71 to the substantially full extent. Therefore, unlike the related art shown in FIG. 14, this embodiment makes it unnecessary to provide a space in the upper part of the fuel tank 1 for accommodating the enlarged diameter portion 12a. Accordingly, a correspondingly increased amount of fuel 71 can be stored, and the fuel tank 1 can be filled up with the fuel 71.

Further, since the guide portion 112b is extended so as to reach a position near the mounting means 23, the electrically conductive ring 22 is allowed to rise to the full level 72. Accordingly, it is possible to enlarge the range within which the liquid level can be detected.

When the relative positions of the coil 16 and the electrically conductive ring 22 vary, the mutual inductance between the ring 22 and the coil 16 changes. The change in the mutual inductance is converted into a change in voltage and displayed on a meter or a lamp by a L-V converting circuit.

Figure 7:
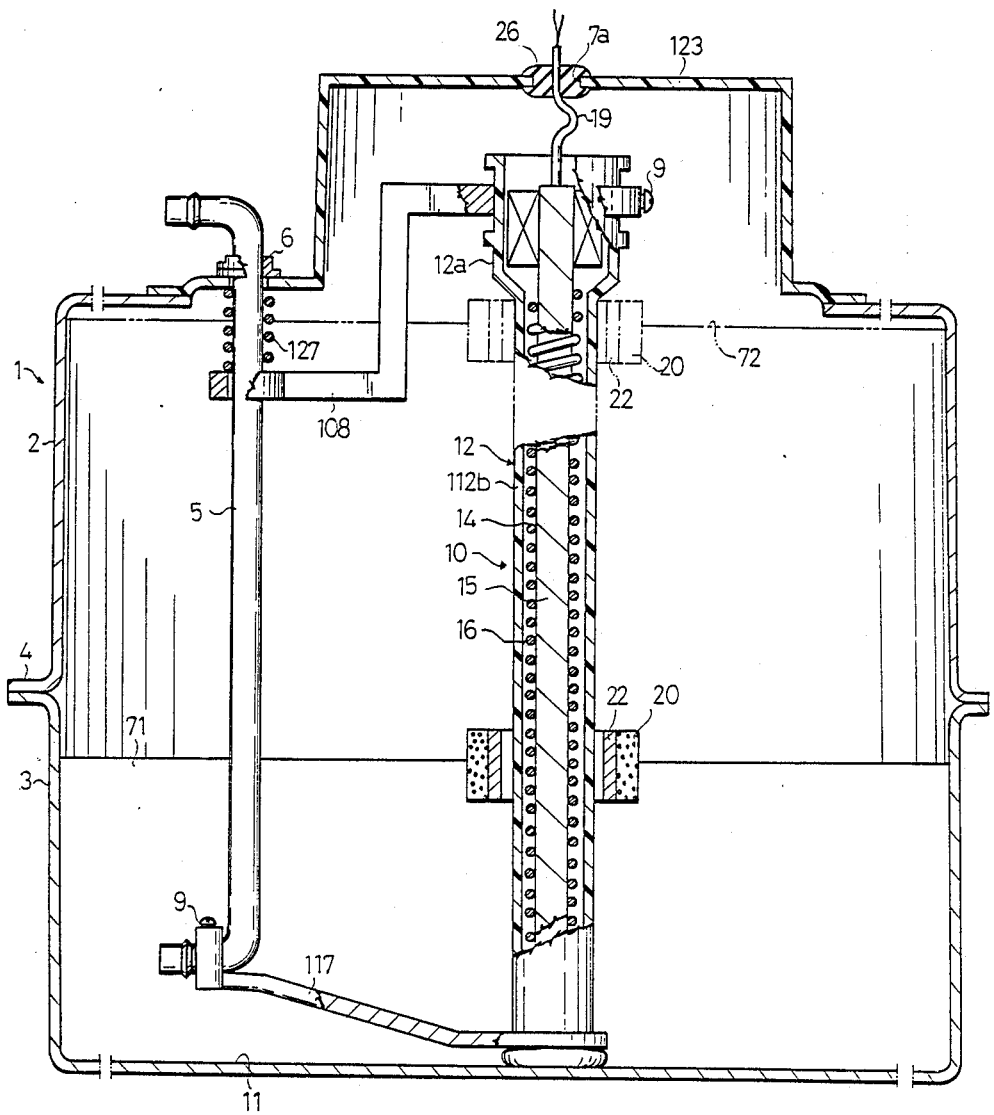
FIG. 7 is a vertical sectional view of a sixth embodiment of the present invention.

A sixth embodiment in which the present invention is embodied in a still further form will next be explained with reference to FIG. 7.

In this embodiment also, the level gage 10 is installed in the fuel tank 1 in such a manner that the enlarged diameter portion 12a projects upward beyond the level of the upper member 2 in the same manner as in the fifth embodiment. However, this embodiment differs from the fifth embodiment in the structure for mounting the level gage 10.

More specifically, the proximal end portion of an upper support member 108 which has a substantially S-shaped configuration in a side view is rigidly secured to the enlarged diameter portion 12a by a securing means 9. The distal end portion of the upper support member 108 is loosely fitted on the upper portion of the bent tube 5 and pressed downward by means of the biasing force from a spring 127 which is fitted on the portion of the bent tube 5 between the lower surface of the accommodating means 123 having a concave cross-sectional configuration and the distal end portion of the upper support member 108.

Accordingly, the level gage 10 is constantly biased downward so that its lower end is in contact with the bottom surface 11 of the lower member 3 at all times.

Further, the proximal end portion of a lower support member 117 which is formed from a resilient material such as a synthetic resin is rigidly secured to the lower portion of the bent tube 5 by a securing means 9, and the lower portion of the level gage 10 is supported by the distal end portion of the lower support member 117 so that said lower portion will not oscillate horizontally.

The other constituent elements, functions and effects thereof are substantially the same as those in the fifth embodiment.

The present invention is not necessarily limited to the above-described embodiments and may be carried out in, for example, the following various forms.

Figure 9:
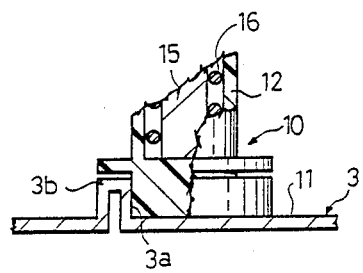
FIG. 9 is a fragmentary sectional view showing another form of the supporting structure shown in FIG. 8.

(1) In the first to fifth embodiments, the arrangement may be such that, as shown in FIG. 9, the lower member 3 itself is shaped so as to form an annular bent portion 3b, and the lower end portion of the level gage 10 is received in the recess 3a which is defined by the annular bent portion 3b, whereby the lower end of the level gage 10 is supported on the bottom surface 11.

Figure 8:
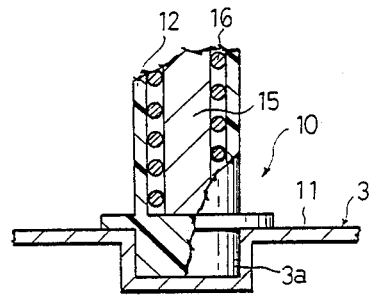
FIG. 8 is a fragmentary sectional view showing a supporting structure for supporting the lower end portion of a level gage.

Alternatively, the above-described recess 3a may be formed by projecting the lower member 3 downward by an amount corresponding to the depth of the recess 3a as shown in FIG. 8.

By so doing, the level gage 10 can be disposed closer to the bottom surface 11, so that the liquid level measurable range is enlarged.

Figure 10:
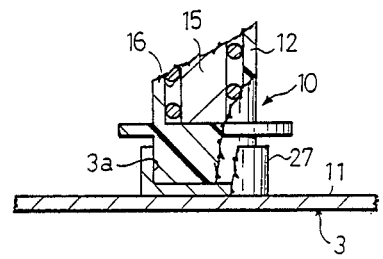
FIG. 10 is a fragmentary sectional view of still another form of the supporting structure shown in FIG. 8.

(2) In the first and third embodiments, the arrangement may be such that, as shown in FIG. 10, a concave member 27 is rigidly secured to the lower member 3 by means, for example, of welding to define a recess 3a, and the lower end portion of the level gage 10 is received in the recess 3a and thereby positioned so that the lower end portion of the level gage 10 will not oscillate horizontally. If the recess 3a is formed in this way, it is advantageously possible to eliminate the need to machine the lower member 3.

Figure 11:
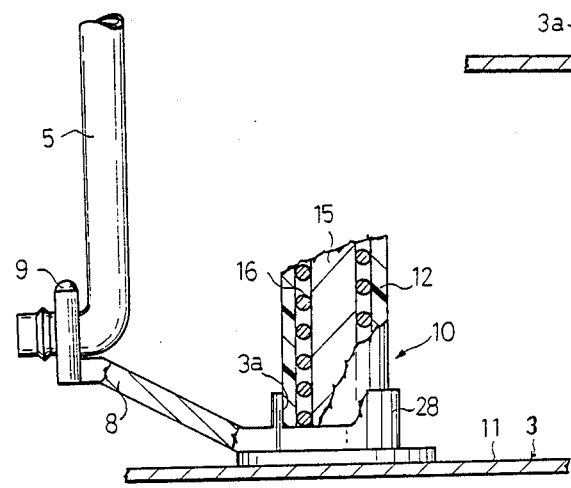
FIG. 11 is a fragmentary sectional view of a further form of the supporting structure shown in FIG. 8.

(3) Further, in the first embodiment the distal end portion of the support member 8 which is rigidly secured to the lower end portion of the bent tube 5 and a bottom member 28 which closes the lower end of the casing 12 may be formed integral with each other as shown in FIG. 11. In this case, if the support member 8 is formed from a resilient material such as a synthetic resin so that the bottom member 28 presses the bottom surface 11 of the fuel tank 1, when the lower member 3 is inflated downward, the level gage 10 can follow the inflation of the lower member 3 even more quickly and reliably.

(4) In the second embodiment, the coil spring 24 may be provided on the outer periphery of the stretchable member 18 or may be formed integral with the stretchable member 18.

(5) The level gage 10 in accordance with the present invention may be installed in various kinds of liquid storage container in addition to the fuel tank 1, for example, water storage tanks and medicine tanks.

(6) A supply port for supplying a liquid may be provided at an appropriate position on these liquid storage tanks 1, the supply port being stoppered hermetically.

Figure 12:
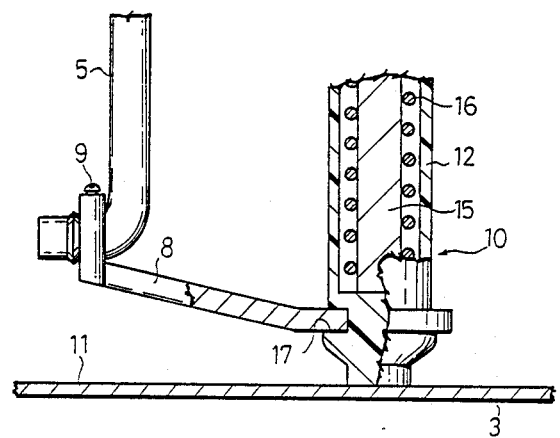
FIG. 12 is a fragmentary sectional view of a still further form of the supporting structure shown in FIG. 8.

(7) Further, the fourth embodiment may be arranged such that, as shown in FIG. 12, the distal end portion of the support member 8 is engaged with the annular groove 17 formed in the lower portion of the level gage 10 to thereby allow the lower end of the level gage 10 to be supported on the bottom surface 11 in the same way as in the first embodiment. In this case, if the support member 8 is formed from a resilient material such as a synthetic resin, when the lower member 3 is inflated downward, the level gage 10 can follow the inflation of the lower member 3 even more quickly and reliably.

(8) In the fourth and fifth embodiments, the arrangement may be such that the diaphragm 118 is formed separately from the cap member 121, and the inner peripheral edge thereof is secured to the enlarged diameter portion 12a, while the outer peripheral edge thereof is secured to the inner peripheral edge of the mounting opening 23b.

(9) In the fourth and fifth embodiments, the diaphragm 118 may be formed from other appropriate materials in addition to a material consisting of a synthetic rubber alone, for example, fiber-reinforced synthetic rubber, synthetic resin elastomer or a metal sheet whose central portion can project.

(10) In the fourth embodiment, the mounting position of the support member 8 with respect to the bent tube 5 may be any position on the bent tube 5, provided that the distal end of the support member 8 can extend near the lower portion of the level gage 10. However, the support member 8 is preferably secured to the lower portion of the bent tube 5 as in the case of the embodiment with a view to enabling the lower portion of the level gage 10 to be positioned reliably.

Figure 13:
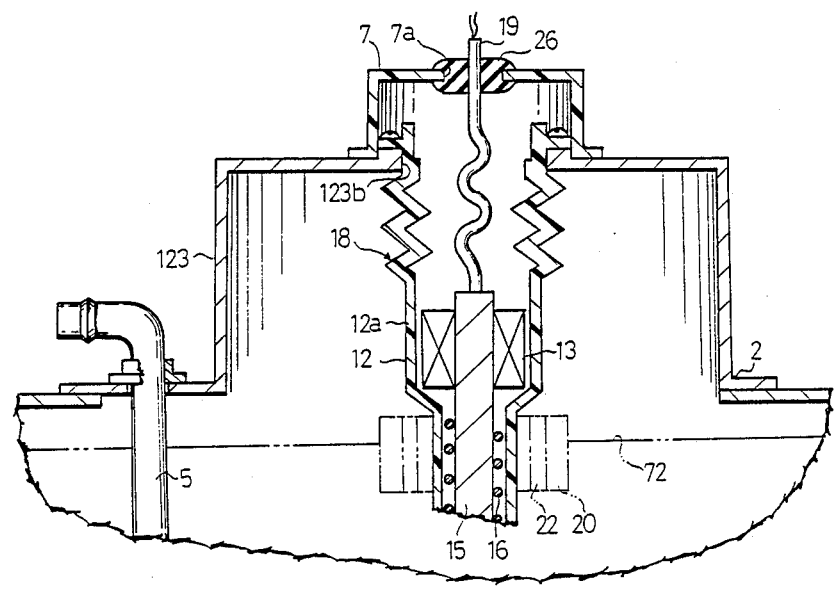
FIG. 13 is a fragmentary sectional view of a structure for supporting the upper portion of a level gage.

(11) In the fifth and sixth embodiments, the enlarged diameter portion 12a of the level gage 10 may be supported by the accommodating means 123 through the stretchable member 18 which is formed integral with the enlarged diameter portion 12a as shown in FIG. 13. In this case, the stretchable member 18 is preferably compressed so that the level gage 10 is constantly biased downward. If circumstances require, a coil spring (not shown) may be provided so as to cooperate with the stretchable member 18.

(12) In the sixth embodiment, the arrangement may be such that the proximal end portion of the upper support member 108 is rigidly secured to the bent tube 5 and the distal end portion thereof is loosely fitted on the enlarged diameter portion 12a of the level gage 10. In this case, the spring 127 is mounted on the enlarged diameter portion 12a.

(13) Although in the sixth embodiment the bent tube 5 is utilized to secure the respective proximal end portions of the upper and lower support members 108 and 117, such an arrangement is not necessarily limitative and it is also possible to employ a pipe or rod-shaped member which has a similar function.

Since it is apparent that a wide variety of different embodiments may be arranged without departing from the spirit and scope of the present invention, it should be noted here that the present invention is not necessarily limitative to the specific embodiments but limited solely by the appended claims.

What is claimed is:

1. A level gage mounting structure comprising:
   (a) a level gage having a casing and being secured to an upper member of a liquid storage container and vertically extending inside said container, said container having an upper and bottom surface, said level gage having its lower end portion supported on the bottom surface of said container; and
   (b) deformable means provided between said upper member and an upper end of said level gage to support the upper end of said level gage, said deformable means being integral with said casing and being deformable vertically in unison with any vertical deformation of the upper and bottom surfaces of said container, thus enabling the lower end of said level gage to be in contact with the bottom surface of said container at all times.

2. A level gage mounting structure according to claim 1, wherein said deformable means is a stretchable member formed so as to be resiliently stretchable, said stretchable member being provided between said container and said level gage in such a manner that said stretchable member is compressed at all times.

3. A level gage mounting structure according to claim 2, further comprising biasing means provided between said container and said level gage to bias said level gage downward.

4. A level gage mounting structure according to claim 2, wherein a lead wire which extends from said level gage is accommodated and protected in said stretchable member.

5. A level gage mounting structure according to claim 2, further comprising mounting means provided in the upper member of said container, said stretchable member being secured to said mounting means, and a protector provided on said mounting means to cover said stretchable member from an upper side thereof.

6. A level gage mounting structure comprising:
   (a) a level gage secured to an upper member of a liquid storage container and vertically extending inside said container, said container having an upper and bottom surface, said level gage having its lower end portion supported on the bottom surface of said container;
   (b) deformable means, located between said upper member and an upper end of said level gage, for supporting the upper end of said level gage, said deformable means being deformable vertically in unison with any vertical deformation of the upper and bottom surfaces of said container, thus enabling the lower end of said level gage to be in contact with the bottom surface of said container at all times;
   (c) a bent tube, mounted on said container to extend vertically inside said container, for discharging a liquid to be contained in said container; and
   (d) a support member provided between the lower end of said level gage and a lower end portion of said bent tube to bias said level gage downward at all times.

7. A level gage mounting structure according to claim 6, wherein said level gage is provided with a bottom member which closes the lower end portion thereof, said support member being formed integral with said bottom member.

8. A level gage mounting structure according to claim 6, wherein said level gage is provided in its lower end portion with an annular groove which circumferentially extends over the entire periphery thereof, said support member being retained by said annular groove.

9. A level gage mounting structure according to claim 1, further comprising a bent tube mounted on said container in such a manner as to extend vertically inside said container for discharging a liquid contained in said container, said container having mounting means detachably secured to an upper side thereof, and said level gage and said bent tube being secured to said mounting means.

10. A level gage mounting structure according to claim 1, wherein said container has a projection provided on its bottom surface, the lower end portion of said level gage being supported by said projection in such a manner that said lower end portion is immovable horizontally.

11. A level gage mounting structure according to claim 1, wherein said container has a recess provided in its bottom surface, the lower end portion of said level gage being received and supported in said recess in such a manner that said lower end portion is immovable horizontally.

12. A level gage mounting structure according to claim 1, wherein said container has a concave member secured to its bottom surface, the lower end portion of said level gage being received and supported in said concave member in such a manner that said lower end portion is immovable horizontally.

13. A level gage mounting structure comprising:
   (a) a level gage secured to an upper member of a liquid storage container and vertically extending inside said container, said container having upper and bottom surface, said level gage having its lower end position supported on the bottom surface of said container; and
   (b) a diaphragm provided between said upper member and an upper gage of said level gage to support the upper end of said level gage, said diaphragm being movable and deformable vertically in unison with any vertical deformation of the upper and bottom surfaces of said container, thus enabling the lower end of said level gage to be in contact with the bottom surface of said container at all times.

14. A level gage mounting structure according to claim 13, further comprising a cap member fitted on the upper end portion of said level gage, said diaphragm being formed integral with said cap member.

15. A level gage mounting structure according to claim 14, wherein said diaphragm is provided at the lower side of said cap member.

16. A level gage mounting structure according to claim 13, wherein said diaphragm is provided with a curved portion between its outer and inner peripheral edge portions for allowing vertical deformation of said diaphragm.

17. A level gage mounting structure according to claim 1, wherein the said upper end portion of said level gage projects upward from the upper surface of said container.

18. A level gage mounting structure according to claim 17, further comprising a bent tube mounted on said container in such a manner as to extend vertically inside said container for discharging a liquid contained in said container, said deformable means including an upper support member provided between the upper end portion of said level gage and an upper end portion of said bent tube.

19. A level gage mounting structure comprising:
(a) a level gage secured to an upper member of a liquid storage container and vertically extending inside said container, said container having an upper and bottom surface, said level gage having its lower end supported on the bottom surface of said container and its upper end projecting upward from the upper surface of said container;
(b) deformable means provided between said upper member and the upper end of said level gage to support the upper end of said level gage, said deformable means being deformable vertically in unison with any vertical deformation of the upper and bottom surfaces of said container, thus enabling the lower end of said level gage to be in contact with the bottom surface of said container at all times; and
(c) a bent tube, mounted on said container to extend vertically inside said container, for discharging a liquid to be contained in said container, said deformable means including an upper support member provided between an upper portion of said level gage and an upper portion of said bent tube.

20. A level gage mounting structure according to claim 19, wherein a first end of said upper support member is rigidly secured to said level gage, while a second end thereof is mounted on said bent tube in such a manner that said second end is movable in a vertical direction along said bent tube, and said bent tube has biasing means provided on its outer periphery between the upper surface of said container and said upper support member, so that said level gage is constantly biased toward the bottom surface of said container through said upper support member.

21. A level gage mounting structure according to claim 20, further comprising a lower support member provided between the lower portion of said level gage and a lower portion of said bent tube for supporting the lower end of said level gage in such a manner that said lower portion of said bent tube is immovable horizontally.

* * * * *